United States Patent
Chien

(10) Patent No.: US 11,620,199 B1
(45) Date of Patent: Apr. 4, 2023

(54) METHOD AND SYSTEM FOR DETECTION OF POST ROUTINE DEVIATION FOR A NETWORK DEVICE

(71) Applicant: Quanta Computer Inc., Taoyuan (TW)

(72) Inventor: Wei-Yu Chien, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 17/651,534

(22) Filed: Feb. 17, 2022

Related U.S. Application Data

(60) Provisional application No. 63/265,982, filed on Dec. 23, 2021.

(51) Int. Cl.
*G06F 11/22* (2006.01)
*G06F 9/4401* (2018.01)

(52) U.S. Cl.
CPC ........ *G06F 11/2284* (2013.01); *G06F 9/4416* (2013.01); *G06F 11/2221* (2013.01)

(58) Field of Classification Search
CPC ............. G06F 11/2221; G06F 11/2284; G06F 11/2294
See application file for complete search history.

(56) References Cited

U.S. PATENT DOCUMENTS

| | | | | |
|---|---|---|---|---|
| 5,379,342 A * | 1/1995 | Arnold | .................. | G06F 21/575 380/2 |
| 11,403,113 B2 * | 8/2022 | Liao | .................... | G06F 9/44505 |
| 2011/0173426 A1 * | 7/2011 | Moore | .................. | G06F 9/4401 714/48 |
| 2013/0017717 A1 * | 1/2013 | Cao | ...................... | G06F 11/2284 439/517 |
| 2014/0189335 A1 * | 7/2014 | Liu | ..................... | G06F 11/1433 713/2 |
| 2014/0195854 A1 * | 7/2014 | Singh | .................. | G06F 11/2284 714/36 |
| 2022/0179962 A1 * | 6/2022 | Lambert | ............... | G06F 15/177 |

FOREIGN PATENT DOCUMENTS

CN          112231162 A   *   1/2021   ..........   G06F 11/2273

OTHER PUBLICATIONS

Wikipedia's Dell DRAC historical version published Nov. 21, 2021 https://en.wikipedia.org/w/index.php?title=Dell_DRAC&oldid=1055507416 (Year: 2021).*

* cited by examiner

Primary Examiner — Joseph O Schell
(74) Attorney, Agent, or Firm — Nixon Peabody LLP

(57) ABSTRACT

A system and method for identifying, analyzing, and repairing deviations in a power-on self-test routine (POST) of a computer system is disclosed. The computer system includes a basic input output system (BIOS) including a POST routine executed between power-on and hand off to an operating system. A memory stores a golden image POST code sequence. The controller and BIOS receive a sequence of POST codes from the execution of the POST routine. The sequence of POST codes is compared to the golden image POST code sequence. A deviation in the POST routine is identified based on at least one POST code of the sequence of the POST codes not matching the golden image POST code sequence. The identified deviation may be analyzed for further information in a message. The message may be used to recover from the deviation.

20 Claims, 10 Drawing Sheets

| Category | Scenario of fault | Recovery mechanism |
|---|---|---|
| Discoverable Hardware | Memory device (DIMM) disappered/missing | Root cause may come from equipment aging, recover by fine tuning margin of driving signal to get best quality. |
| | PCIe device speed downgraded, linkwidth reduced. | Root cause may come from equipment aging, recover by rerunning LTSSM (Link Training and Status State Machine) by using software reset command to PCIe device. |
| | I2C, I3C device disconnected | Root cause may come from equipment in busy state, recover by performing the Bus rest command and retry communication. |
| Software | Memory buffer overflow | Root cause may come from memory space to be reallocated, recover by releasing all memory space allocated. |
| | Function surprised disabled | Root cause may come from dependency after associated feature enabled/disabled, recover by reloading server default configuration setting. |
| | Software deadlock | Root cause may come from no response of communication from hardware component, recovery by resetting target device. |

FIG. 8

METHOD AND SYSTEM FOR DETECTION OF POST ROUTINE DEVIATION FOR A NETWORK DEVICE

TECHNICAL FIELD

The present disclosure relates generally to boot routines for computing devices. More particularly, aspects of this disclosure relate to a system that identifies, diagnoses, and repairs deviations encountered in a power-on self-test (POST) routine of a boot-up process.

BACKGROUND

Servers are employed in large numbers for high demand applications, such as network based systems or data centers. The emergence of the cloud for computing applications has increased the demand for data centers. Data centers have numerous servers that store data and run applications accessed by remotely connected, computer device users. A typical data center has physical chassis structures with attendant power and communication connections. Each rack may hold multiple computing servers and storage servers.

The servers in a data center facilitate many services for businesses, including executing applications, providing virtualization services, and facilitating Internet commerce. As companies place more dependence on these services from data center servers, uptime becomes more critical and valuable. When a server is down, productivity slows down or stops entirely, costing businesses profitability. Although a data center manager may take every precaution to prevent service from being interrupted from faults in the servers, the problem of server downtime is difficult to fully eliminate. The primary causes of server downtime may include server hardware faults, making hardware upgrades, making software upgrades, and accidents from server maintenance. Data center management usually has a plan for coping with server downtime with different contingencies tailored to the cause of the downtime, considering the potentially high and damaging costs of extensive downtime. However, in recovering the servers, each server must be restarted.

Each individual server is typically powered-up with a power-on self-test (POST) routine to begin operation. During a POST routine for a computer system, such as a processor core on a server, the basic input output system (BIOS) is executed by the processor core to initialize the hardware of the server. After successful completion of the POST routine, control is handed over to the operating system of the server.

Powering up a server is complex process. The Unified Extensible Firmware Interface (UEFI) BIOS firmware must perform diverse procedures in the POST routine to initialize and activate all hardware components until the operating system for the server platform is ready. These procedures include executing individual processes in sequence for initializing hardware components, enabling software features, performing server security activity, and executing routines for platform fault resilience. In general, each one of the software programs in the POST routine usually preserves a significant checkpoint describing the software program's purpose, behavior, result, and status. The checkpoint is output by a visible message that may be displayed on a terminal screen, specific LCD panel, LED indicator, and/or console redirection. An administrator can also examine checkpoints by reviewing system event log files in both in-band (non-volatile memory of the server) and out-of-band (a system error log stored by a baseboard management controller (BMC)) locations.

When the server runs in a reliable environment (e.g., stable power supply, cool temperature, and suitable humidity), the record of sequential checkpoints is identical for every time the server is powered up, unless the user has new firmware settings, or a hardware configuration is adjusted. The vast majority of record changes in the sequential checkpoints are normal operation and expected behavior, such as software programs referring to environment variables and logical operations, therefore performing a different routine. However, in certain instances, the record change of the sequential checkpoint is harmful to server operations. In such instances, it is difficult to predict when, how and why disruptions may happen. Thus, such occurrences ultimately extend server downtime and impact service offered by data centers.

Thus, there is a need for a system that includes a POST routine that identifies specific deviations based on examination of sequential POST codes. There is also a need for a system that allows diagnosis of deviations in a POST routine. There is also a need for a system that recommends recovery actions from deviations in a POST routine.

SUMMARY

One disclosed example is a computer system that detects deviations in a power-on self-test routine (POST). The computer system includes a basic input output system (BIOS) with a power-on self-test (POST) routine having multiple phases executed between power-on and hand off to an operating system. A controller is in communication with the BIOS. A memory is coupled to the controller and the BIOS. The memory stores a golden image POST code sequence. The controller and BIOS are operable to receive a sequence of POST codes from the POST routine that are generated on execution of the multiple phases. The sequence of POST codes is compared to the golden image POST code sequence. A deviation in the POST routine is identified based on at least one POST code of the sequence of the POST codes not matching the golden image POST code sequence.

A further implementation of the example system is an embodiment where the controller is a baseboard management controller. Another implementation is where the computer system is a server. Another implementation is where the computer system includes a network interface and where the comparison is transmitted to a remote management server. Another implementation is where the deviation is one of a disablement of a security feature phase, impairment of a security feature phase or detection of an untrusted condition of the POST routine. Another implementation is where the deviation is one of a hardware device of a plurality of hardware devices not found from a discovery procedure in the POST routine, an inactive hardware interface, or a decline of hardware speed of a hardware device after initialization by the POST routine. Another implementation is where the deviation is one of an invalid, unavailable or unsupported software service. Another implementation is where the memory is flash memory storing the POST code sequence. Another implementation is where the golden image POST code sequence is upgradable through server management software transmitting an updated golden image POST image to the controller via a network interface. Another implementation is where the controller and BIOS are further operable to: perform a deviation analysis based on the identified deviation; store a message including the results of the deviation analysis; and power cycle the computer system after performance of the deviation analysis. Another implementation is where the deviation analysis includes a recovery method for repairing the deviation where the BIOS and the controller are further operable to automatically perform the recovery method after the power cycle.

Another disclosed example is a method of identifying a deviation in a POST routine executed on start-up of a computer system including a basic input output system (BIOS). The BIOS includes a power-on self-test (POST) routine having multiple phases executed between power-on and hand off to an operating system. The computer includes a controller in communication with the BIOS and a memory coupled to the controller and the BIOS. A golden image POST code sequence is stored in the memory. The POST routine of the BIOS is executed. A sequence of POST codes is received from the POST routine generated on execution of the multiple phases of the POST routine. The sequence of POST codes is compared to the golden image POST code sequence via the controller. A deviation in the POST routine is identified based on at least one POST code of the sequence of the POST codes not matching the golden image POST code sequence.

Another implementation of the example method is where the controller is a baseboard management controller, and the computing device is a server. Another implementation is where the method further includes transmitting the comparison to a remote management server via a network interface. Another implementation is where the deviation is one of a disablement of a security feature phase, impairment of a security feature phase, or detection of an untrusted condition of the POST routine. Another implementation is where the deviation is one of a hardware device not found from a discovery procedure in the POST routine, an inactive hardware interface, or a decline of hardware speed of a hardware device after initialization by the POST routine. Another implementation is where the deviation is one of an invalid, unavailable or unsupported software service. Another implementation is where the method further includes performing a deviation analysis based on the identified deviation; storing a message including the results of the deviation analysis; and power cycling the computer system after performance of the deviation analysis. Another implementation is where the method includes repairing the deviation via data in the message.

Another disclosed example is a non-transitory computer readable medium having stored thereon software instructions that, when executed by a processor in a computer system, cause the processor to execute multiple phases of a power-on self-test (POST) routine for the computer system. The instructions further cause the processor to output a sequence of POST codes during the execution of the POST routine. The instructions further cause the processor to compare the sequence of POST codes to a golden image sequence of POST codes. The instructions further cause the processor to identify a deviation in the POST routine based on at least one POST code of the sequence of the POST code not matching the golden image POST code sequence.

Another disclosed example is a computer system for analyzing deviations in a power-on self-test routine (POST). The computer system includes a basic input output system (BIOS) having a power-on self-test (POST) routine having multiple phases executed between power-on and hand off to an operating system. The computer system includes a controller in communication with the BIOS. The controller and BIOS are operable to receive an identified deviation in the POST routine in the form of a POST code. The controller and BIOS perform a deviation analysis based on the identified deviation. The controller and BIOS store a message including the results of the deviation analysis in a destination device and power cycle the computer system after performance of the deviation analysis.

A further implementation of the example system is an embodiment where the controller is a baseboard management controller. Another implementation is where the computer system is a server. Another implementation is where the deviation analysis is activated by setting a UEFI variable in the BIOS. Another implementation is where the message includes an automatic recovery for recovering the POST routine from the deviation. Another implementation is where a manual recovery, where the controller alerts an administrator and shuts down the computer system. Another implementation is where the message includes a human readable schema and a technical schema. Another implementation is where the human readable schema includes a definition, a cause of the deviation, a method of recovery, and a risk evaluation. Another implementation is where the technical schema includes metadata having various lengths and contents describing a deviation specific service routine. Another implementation is where a recovery routine specified by the message is executed by either the controller or the BIOS firmware. Another implementation is where the recovery routine includes one of optimizing hardware component initialization, clearing doubtful data structures, or reloading a custom golden setting. Another implementation is where the deviation analysis routine is written specifically for identified hardware or software components based on documentation provided by a hardware or software developer. Another implementation is where the destination device is one of a system memory, a storage device, or a flash memory accessible by the controller.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which:

FIG. 8 is a table of potential recovery mechanisms based on diagnosis of faults that may be output by the recovery function of the example module, according to certain aspects of the present disclosure.

Figure 1:
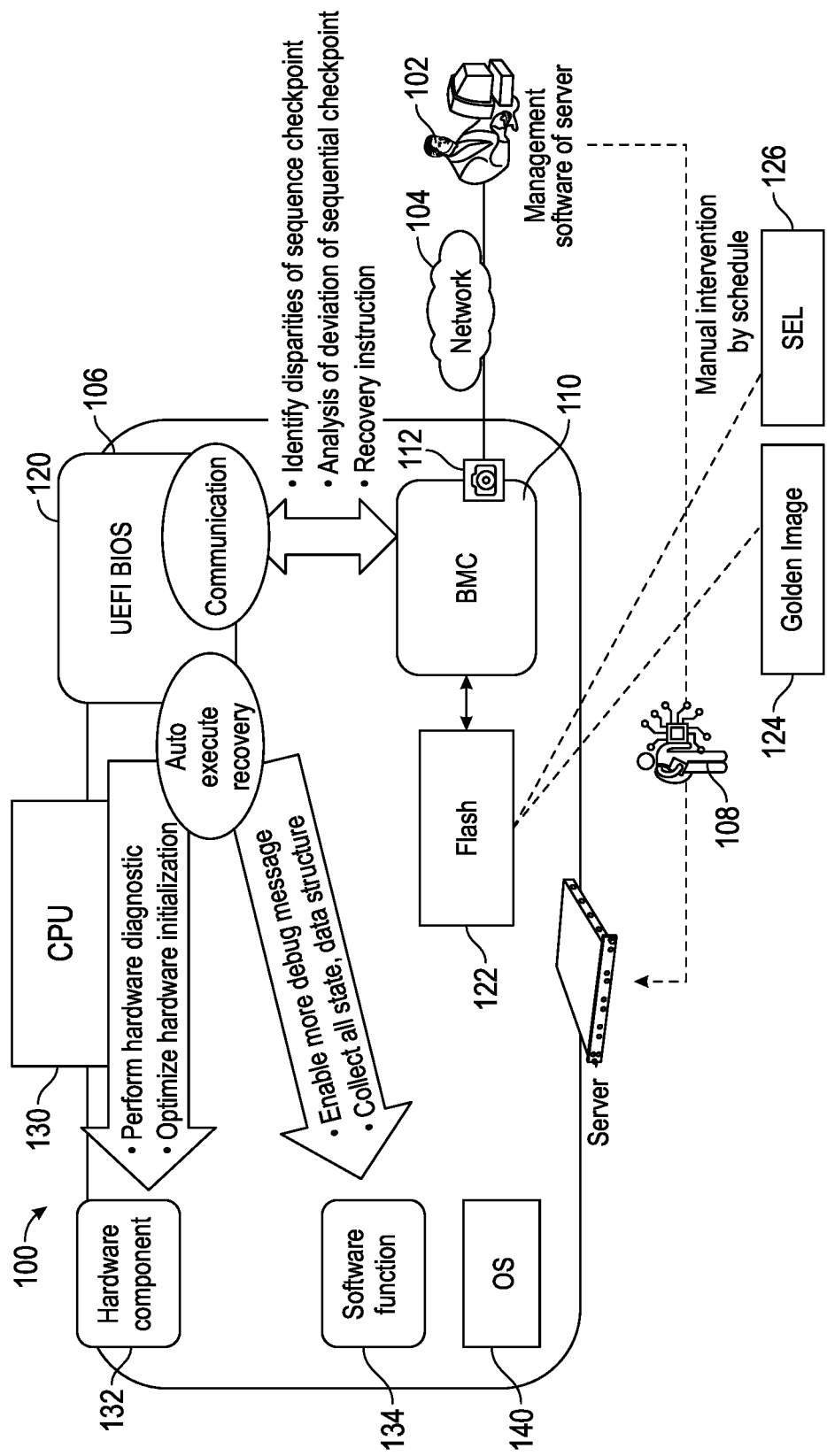
FIG. 1 is a block diagram of a computer system with components that execute an example POST routine that includes a module for identification, diagnosis and repair of deviations in the POST routine, according to certain aspects of the present disclosure.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The examples disclosed herein include a firmware module that may be executed in both UEFI BIOS firmware and BMC firmware to facilitate identifying and addressing deviations in a POST routine in a computer device. The example module identifies disparities of sequential checkpoints output by the POST routine by comparing output POST codes to the POST codes of a golden record POST routine every time a server is powered-up. The routine may determine a potential abnormal and harmful boot sequence which may decrease performance, extend downtime time and perform denial of secure functions on server. The examination of disparities on sequential checkpoints from the POST routine involves tracing the execution path of the POST routine and providing an imperative data structure to the operating system (OS). The routine outputs the status of secure functions and results of motherboard hardware initialization through the sequential POST codes. The routine includes a novel module that determines deviation of a sequential checkpoint in a POST routine, determines the causes of each divergence, estimates the risk of the divergence, and then suggests suitable manual or automatic recovery mechanisms.

FIG. 1 shows a remote system 100 that allows management of remote devices such as servers in a data center. The remote system 100 includes a remote server management and service station 102 that may be accessed by a data center operator, a network 104, and a remote computer system such as a server 106. The remote server management and service station 102 allows the data center operator to access management interfaces that allow the operator to perform remote diagnostics of the server 106. As will be explained, the service station 102 also receives operational data from the server 106. Other personnel such as a technician 108 may perform manual interventions such as replacing faulty hardware components on the server 106 based on a schedule provided by the service station 102.

The server 106 includes a baseboard management controller (BMC) 110. The BMC 110 includes a network interface card or network interface controller 112 that is coupled to the network 104. The BMC 110 is coupled to a boot firmware such as a Unified Extensible Firmware Interface (UEFI) basic input output system (BIOS) firmware 120. A flash memory 122 is used by the BMC 110 to store relevant operation data relating to the server 106 and other firmware executed by the BMC 110. In this example, the flash memory 122 stores a golden file 124 and a system error log (SEL) 126. In this example, the golden file 124 may be downloaded by the BMC 110 from the service station 102. As will be explained the golden file 124 contains the expected POST code sequence from executing the POST routine. The server 106 includes hardware components 130 and 132 that may perform functions such as storage, computing and switching. For example, the hardware component 130 may be a CPU. The other hardware components 132 may be other processors, memory devices (e.g., dual in line memory modules, SATA devices and the like), PCIe devices, etc. It is understood that there may be many hardware components on a typical server.

The UEFI BIOS firmware 120 optimizes hardware initialization of hardware components of the server 106, such as the hardware components 130 and 132 through the POST routine. The BMC 110 may also perform hardware diagnostics of hardware components of the server 106, such as the hardware components 130 and 132. The BMC 110 also monitors the health of hardware components of the server 106, such as the hardware components 130 and 132. The POST routine also interacts with POST software processes 134 to enable debug messages and collect all state and data structure information from such processes. Once the POST routine of the UEFI BIOS firmware 120 is complete, an operating system (OS) 140 begins operation of the server 106.

In this example, the UEFI BIOS firmware 120 includes an example module in the POST routine that reports disparities in sequential checkpoints output by the POST routine. The example module in the POST routine identifies deviations from the sequential checkpoints of the POST routine from the checkpoints from the stored golden record. Identification, analysis, and recovery from deviations make the server 106 more resilient and efficient. The example module thus provides analysis of the disparities that are forwarded to the BMC 110 in human readable metadata format (e.g., the Redfish REST API format for JSON), and then may be collected by server management software executed by the service station 102. The administrator/IT engineer may provide a policy definition for addressing deviation. For example, the policy may instruct the server 106 to perform automatic recovery processes immediately or wait for manual intervention by a schedule by the technician 108.

In general, recording the POST codes output from the UEFI BIOS firmware 120 between power on of the server 106 until handoff to the OS 140 is a very useful software trajectory tracing method. The software developer uses unique ASCII encoding for POST codes that are provided for various execution purposes. The ASCII encoded POST codes are embedded at important execution points such as beginning, ending, or divergence of software such as the UEFI BIOS firmware 120. The UEFI BIOS firmware 120 redirects the resulting POST codes to an accessible destination. The POST codes are sequentially recorded from the first output code to the last output code as a history of the UEFI BIOS firmware power-on sequence for the server 106.

Figure 2:
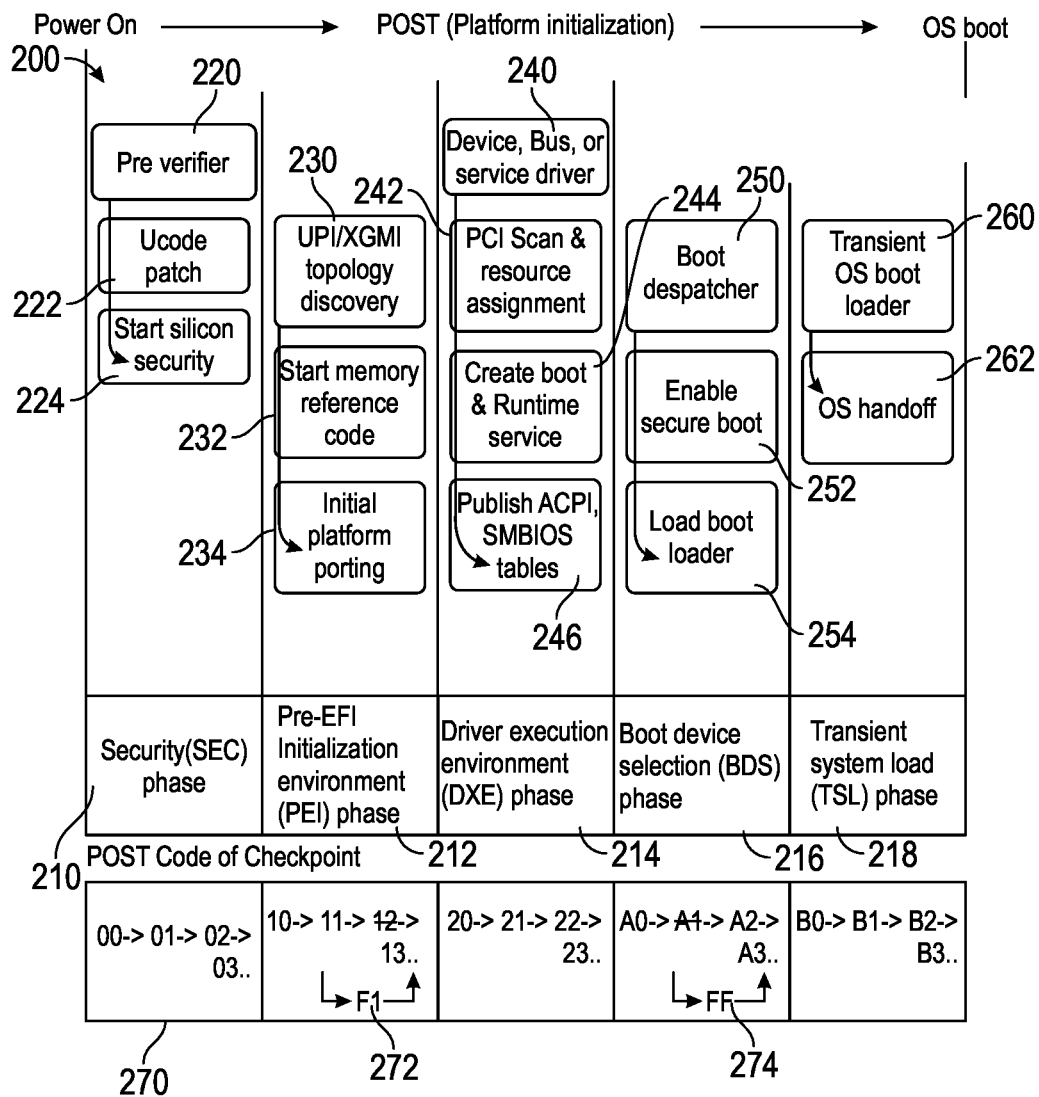
FIG. 2 is a process diagram showing the different steps and corresponding POST codes in an example POST routine, according to certain aspects of the present disclosure.

FIG. 2 is a process diagram 200 showing different sequential phases of the POST routine from initial power-on to handing control to the operating system 140. Thus, a first column 210 represents a security phase; a second column 212 represents a pre-extensible framework interface (EFI) initialization environment (PEI) phase; a third column 214 represents the driver execution environment (DXE) phase; a fourth column 216 represents a boot device selection (BDS) phase; and a fifth column 218 represents a transient system load (TSL) phase.

The security phase 210 is initiated by a pre-verifier 220 that applies a Ucode patch 222 and starts silicon-based security routines 224. The PEI phase 212 includes a UPI/XGMI topology discovery process 230, a start memory reference code process 232, and an initial platform porting process 234.

A set of drivers 240, such as a device driver, bus driver, or service driver implements the DXE phase 214. Each of the drivers sequentially executes until the end of the DXE phase 214. This phase includes a PCI scan and resource assignment process 242, a create boot and runtime service process 244, and a publish ACPI and SMBIOS tables process 246.

The boot device selection phase 216 includes a boot dispatcher process 250, an enable secure boot process 252, and a load boot loader process 254. The transient system load (TSL) phase 218 includes a transient operating system boot loader process 260 and an operating system handoff process 262. At the end of the transient system load phase 218, control is handed off to an OS boot loader, such as Linux GRUB, and the operating system 140 boots-up and starts.

A set of sequential POST codes 270 is output by the POST routine as each of the processes of the phases 210, 212, 214, 216, and 218 are initiated and completed. In this example, the UEFI BIOS firmware image 120 has a complete POST code table to describe functional definitions for each code. Thus, the code definitions of each POST code can assist an administrator or a developer to understand the execution of each step of the POST routine. A normal sequence of POST codes for the security phrase 210 is 0x00-03, a normal sequence of POST codes for the PEI phase 212 is 0x10-13, a normal sequence of POST codes for the DXE phase 214 is 0x20-23, a normal sequence of POST codes for the boot device selection phase 216 is 0xA0-A3, and a normal sequence of POST codes for the TSL phase 218 is 0xB0-B3.

If one of the processes encounters a deviation, an alternate POST code is output and in the POST code sequence. In this example, a first deviation 272 replaces the POST code 0x12 with the POST code 0xFI for the initial platform porting process 234, indicating an error in the platform porting. Thus, the POST code 0x12 is part of service routine "initial platform porting" that performs particular hardware initialization such as configuring output port settings and whether write and read testing is successful. In case of the reading test being incorrect, the POST code 0xF1 is sent out instead of the normal POST code 0x12. A second deviation 274 replaces the normal POST code A1 with the POST code FF for the enable secure boot process 252 indicating an error in that process. The POST code 0xA1 indicates that the hardware initialization of a trusted platform module (TPM) controller to perform an enable secure function and programming and read status of the controller is success. When the read status is incorrect, the POST code 0xFF is be sent out instead of normal POST code 0xA1. In this example, both of these deviations affect the ability to handoff control to the operating system 140 as the operating system 140 may not be able to run due to failure of certain ports or controllers.

The example module in the example POST routine has three major functions to assist in ensuring an efficient POST routine despite deviations in the POST routine. The three functions include deviation identification, deviation analysis, and deviation recovery. The deviation analysis function is invoked automatically after a harmful deviation from the sequential POST code is identified. The harmful deviations may include situations where server associated security features are disabled or reduced, a hardware communication interface malfunctions or degrades, a software protocol or service is invalid or unsupported and the like.

Thus, the deviation identification function compares a record having the POST sequence code output by the UEFI BIOS firmware 120 during the POST routine with a POST sequence code of the golden file image 124. The deviation analysis function enables a comprehensive message output from any disparities in the sequential checkpoints. The message output includes both a human readable schema and a technical schema relating to the deviation. The deviation analysis function also performs diagnostics on the suspect hardware component and collects additional information from the server 106. The deviation recovery function performs different recovery steps to mitigate the deviation such as optimizing hardware component initialization, clearing doubtful data structures inside non-volatile memory, and reloading a custom golden setting for the BIOS firmware 120.

Figure 3:
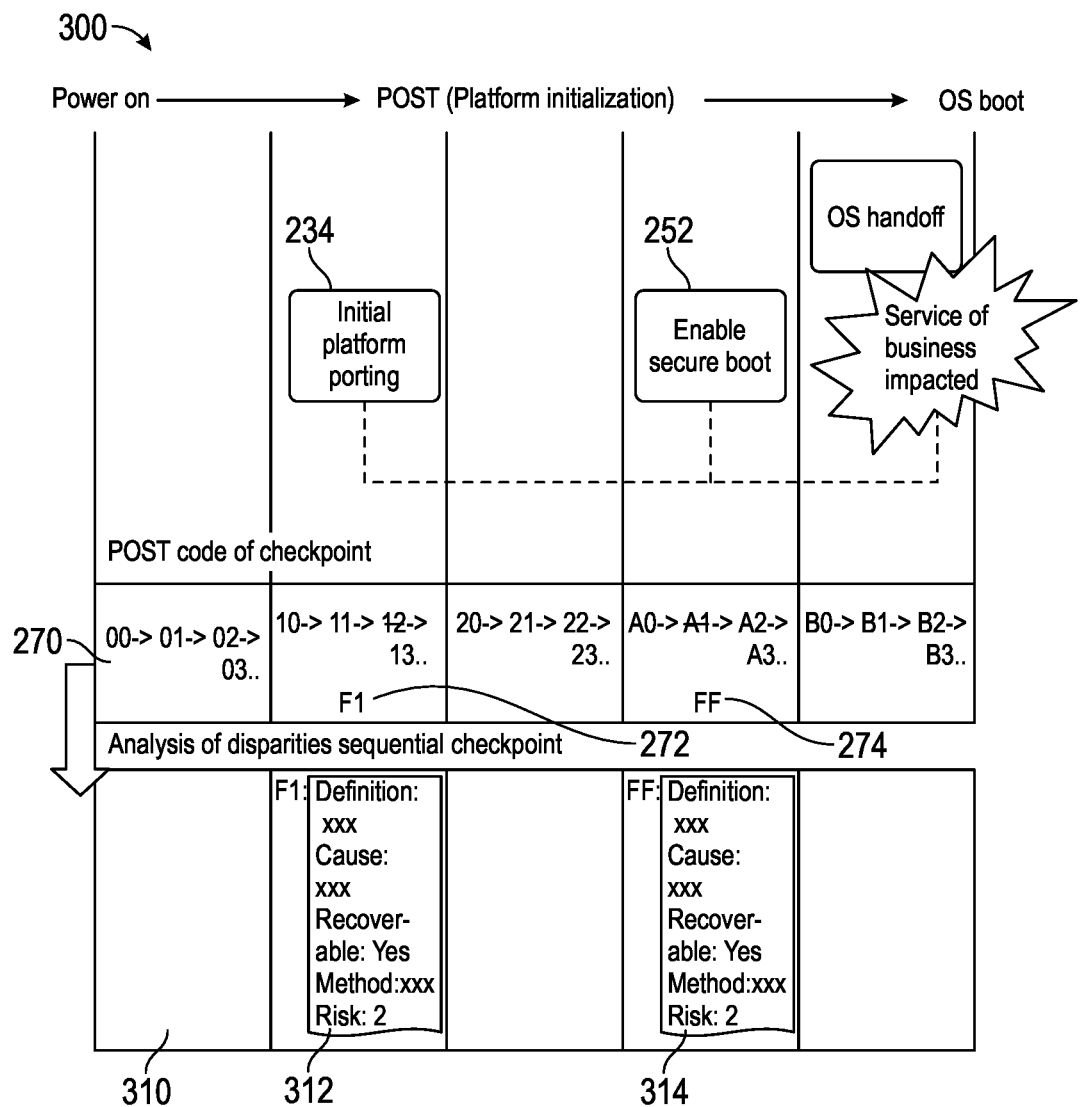
FIG. 3 is a process diagram showing the diagnosis from the example module of the POST routine, according to certain aspects of the present disclosure.

FIG. 3 is a process diagram 300 that indicates the information provided by the example module in the POST routine. The module compares the output POST code sequence 270 with the POST sequence of the golden file image 124 in FIG. 1. As explained above, the deviation identification function determines the different codes output by the initial platform porting 234 and the enable secure boot process 252 from a normal POST sequence of the golden image.

The example module conducts a disparity analysis that outputs a series of messages 310. In this example, the deviation analysis function outputs messages that includes human readable schema and technical schema. The human readable schema includes a definition of the POST code deviation, a cause of the deviation, whether the deviation is recoverable, the corresponding method of recovery, and a risk evaluation. For example, the risk evaluation may be a numerical score between 1 and 5 based on the deviation analysis. In this example, the risk evaluation score is determined from a table. In this example, a risk score of 1 is assigned when a hardware function is malfunctioning or a software feature is inactive with no way to reactivate the feature immediately. A risk score of 2 is assigned when a secure feature is inactive without permission but reactivation may be available. A risk score of 3 is assigned when hardware capability is degraded and a retry mechanism (such as speed down or reducing link width) is available. A risk score of 4 is assigned when a software feature is disabled without permission and re-enabling the feature is available. A risk score of 5 is assigned when a software data structure or layout is incorrect and a retry mechanism such as data buffer overflow is available.

As shown in FIG. 3, a first message 312 output by the example module includes the information in human readable form relating to the deviation in the initial platform porting 234. A second message 314 includes the information in human readable form relating to the deviation in the enable secure boot process 252.

In this example, the deviation identification function is performed comparing the POST code of a golden image corresponding to the UEFI BIOS firmware 120 and the actual POST codes. In order to identify the deviation of the POST code of the UEFI BIOS firmware 120, golden files of sequential POST codes such as the golden file 124 in FIG. 1 representing the available configurations for the server 106 are stored in non-volatile memory such as the flash memory 122 for the BMC 110. The content of the golden file 124 only presents significant sequential POST codes, which execute on the period of extremely important parts of the initialization sequence. For example, 0xA0, 0xA1, 0xA2 are necessary sequential POST codes that are output by the processes in the boot device selection phase 216.

As administrator enabled feature of "rack server correct POST code maintenance" redirects every POST code output by the UEFI BIOS firmware 120 during the power-on to be saved in an accessible destination (such as flash memory 122 or other BMC memory). Thus a remote server such as the management station 102 may access the POST code output. In this example, the module of the POST routine is executed by the BMC 110 to compare whether the POST routine of the server 106 outputs an identical sequence of POST codes in accordance with the content of the golden file 124 of POST codes. If a harmful deviation is detected from the comparison of the POST codes showing a different POST code than the expected POST code, the BMC 110 enables the "Deviation Analysis" and "Deviation Recovery" intervention service routines in both the UEFI BIOS firmware 120 and the BMC 110.

Figure 4A:
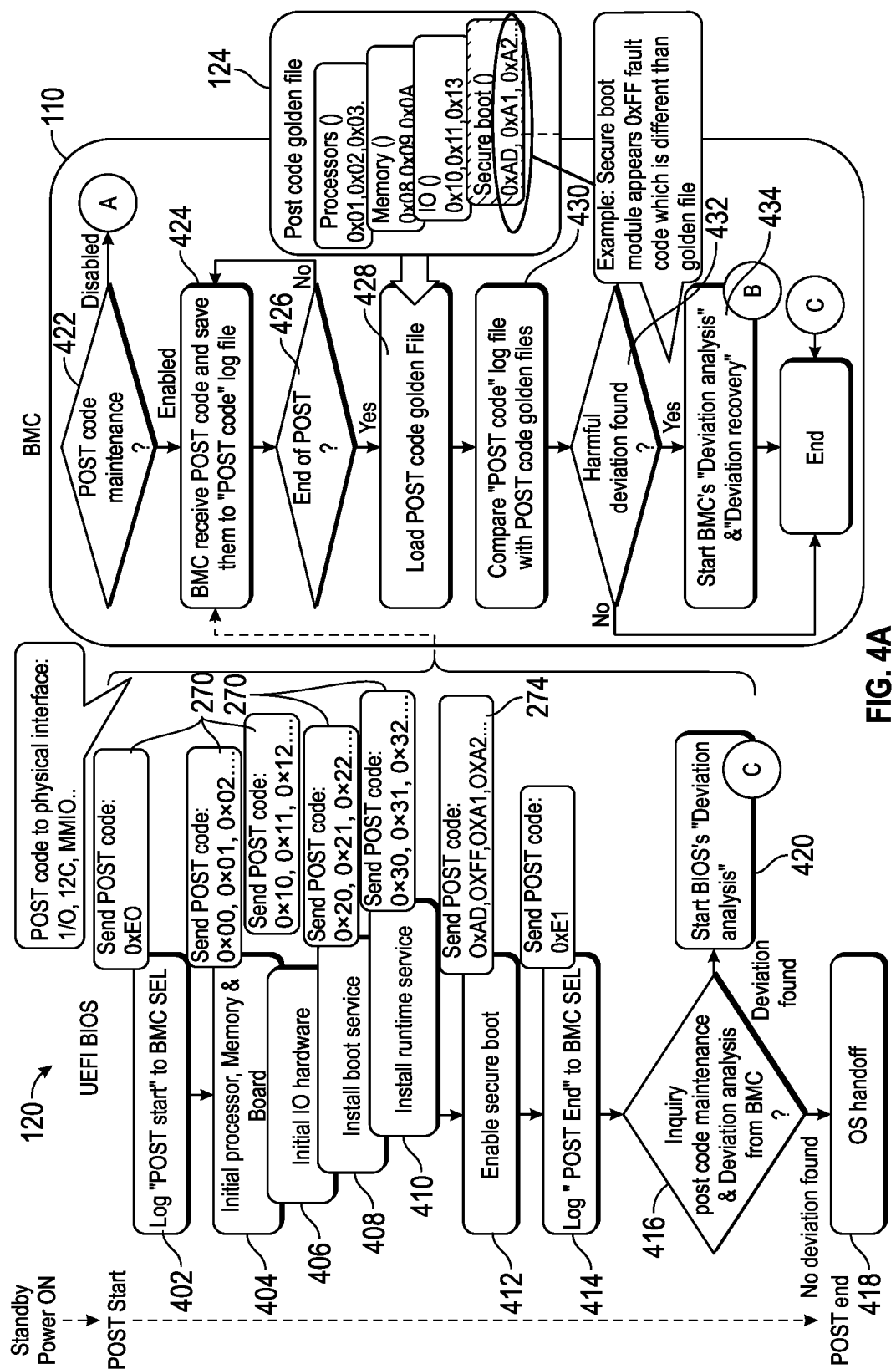
FIG. 4A-4C is a flow diagram of the identification, diagnosis, and repair functions of the example module of the POST routine, according to certain aspects of the present disclosure.
Figure 4B:
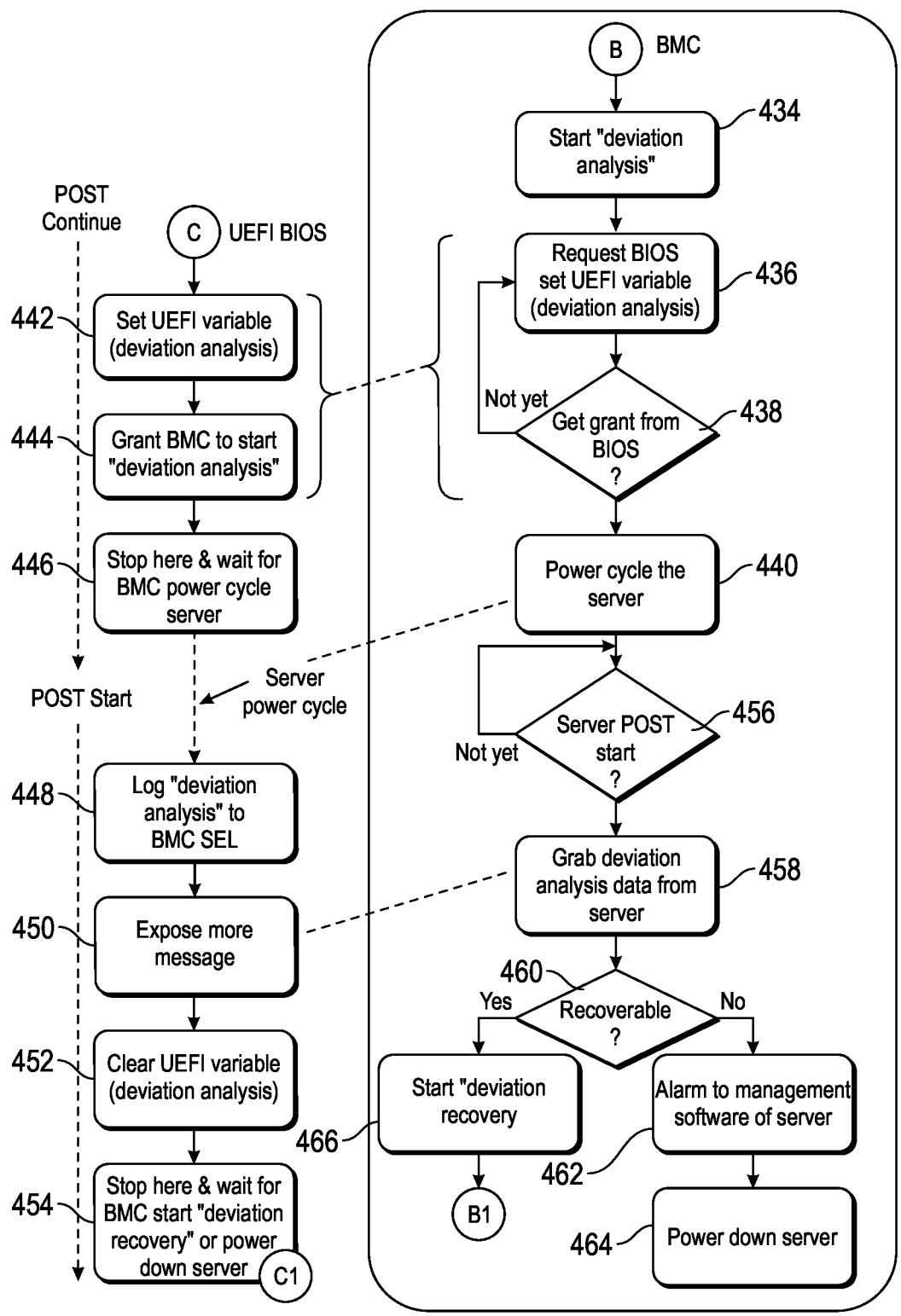
Figure 4C:
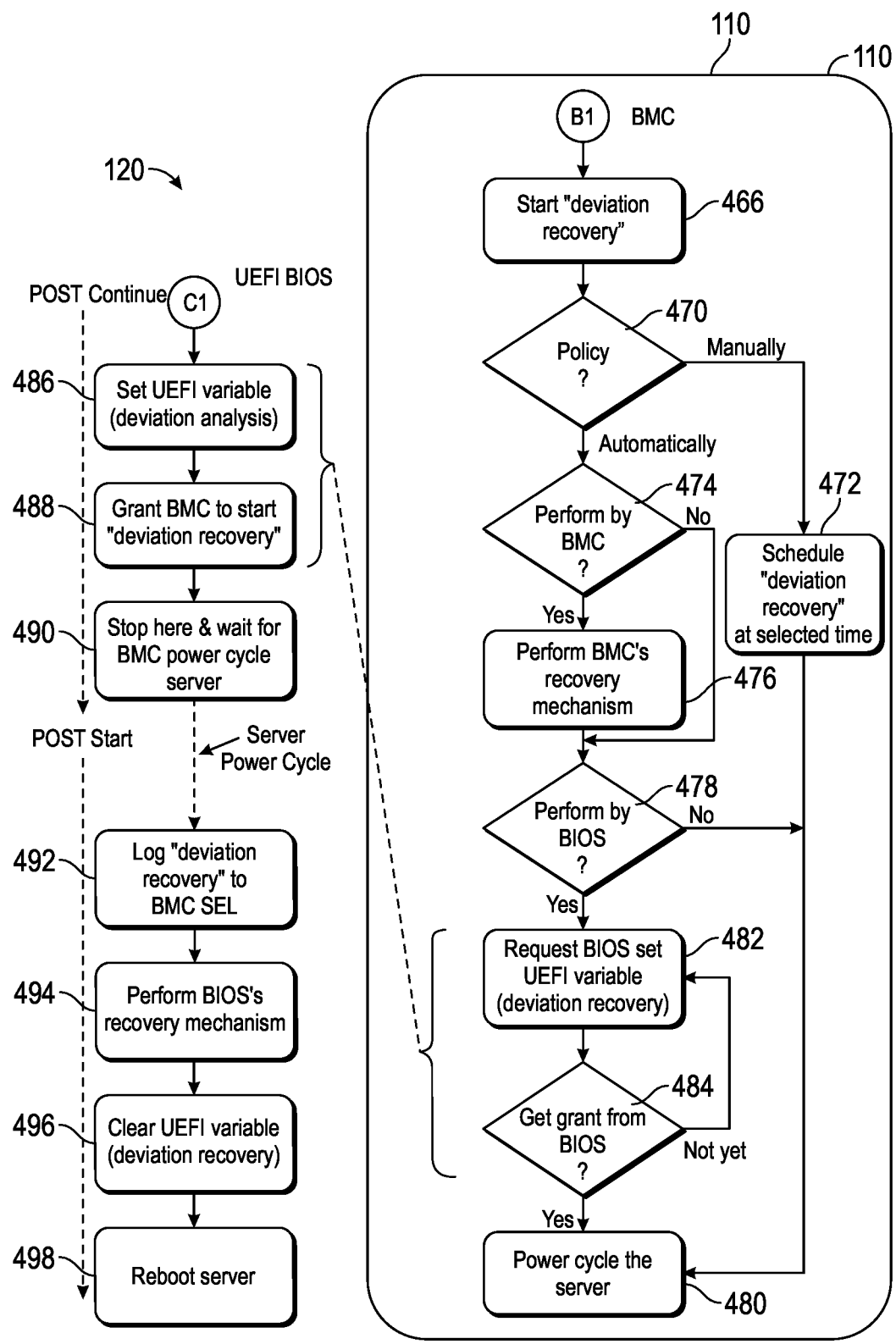

FIGS. 4A-4C are a flow diagram showing the three phases of the routine performed by the example module that includes deviation identification, deviation analysis, and deviation recovery functions. FIG. 4A shows the process of the deviation identification function in the overall process that is performed by the UEFI BIOS 120 and the BMC 110 in FIG. 1. In this example, the UEFI BIOS 120 logs the POST routine start to the system error log (SEL) 126 of the BMC 110 (402). An initial POST code (0xE0) is thus logged. The UEFI BIOS 120 then initializes the processor, memory, and other components on the mother board (404). The UEFI BIOS 120 then initializes the input/output hardware (406). The UEFI BIOS 120 then installs the boot service (408). The UEFI BIOS 120 then installs the runtime service (410). Each of the POST steps 402, 404, 406, 408, and 410 results in sending POST codes 270 indicating the beginning and completion of various steps to the BMC 110.

The UEFI BIOS 120 then enables a secure boot (412). In this example, a deviation occurs that is reflected in a POST code such as the POST code 274 in the POST code sequence 270 in FIG. 2. After the secure boot, the UEFI BIOS 120 logs a POST end to the SEL of the BMC 110 through a POST code (0xE1) (414). The UEFI BIOS 120 then determines whether the result of the POST code and deviation analysis should be enabled from the BMC 110 (416). If no deviation is found, the POST routine ends with a handoff to the OS 140 (418). If a deviation is found, such as the POST code 274 generated by the secure boot process, the BIOS deviation analysis is initiated (420).

For example, certain hardware deviations may occur that result in specific POST codes being output in the POST code sequence. Such hardware deviations may occur because a hardware device is not found from the discovery procedure in the POST routine, a hardware interface is inactive after initialization, or hardware speed of a hardware device declining after initialization. In such instances, the deviation will result in a fault or caution code being output in the POST code sequence. Another example of deviations in the POST routine may be based on security type deviations, such as an inactive security feature, which may be because a Root of Trust device is not present. In such an instance, the deviation will result in a fault or caution code being output in the POST code sequence. Another security deviation may be where an untrusted condition is detected such as when an unsigned UEFI driver is loaded. Such a deviation may be indicated by an incomplete POST sequence as no POST code would be output for the unsigned driver. Another example deviation is based on software such as a software protocol being unsupported from the installation procedure or a data structure being unavailable from the initialization procedure. In such instances, the deviation results in a fault or caution code being output in the POST code sequence.

During the performance of the deviation functions in FIG. 4A, the BMC 110 determines whether the POST code maintenance that allows performance of the service routines is enabled by the administrator (422). If the POST code maintenance is not enabled, the BMC 110 takes no further action. If the POST code maintenance is enabled, the BMC 110 receives the POST codes 270 output by the POST routine of the UEFI BIOS 120 and saves them to a POST code log file in memory such as system memory or the flash memory 122 (424). After receiving each POST code, the BMC 110 determines whether the received POST code indicates the end of the POST routine (426). If the received POST code does not indicate the end of the POST routine, the BMC 110 continues to receive and save POST codes (424). If the POST code indicating the end of the POST routine is received, the BMC 110 loads the POST code golden file 124 from the flash memory 122 (428). The BMC 110 then compares the POST code log file with the POST code sequence from the POST code golden file 124 (430). The BMC 110 determines whether a harmful deviation is found (432). If no harmful deviations are found, the BMC ends the routine. If a harmful deviation is found, the BMC 110 starts the BMC deviation analysis and BMC deviation recovery routines (434). The BMC 110 will also alert the UEFI BIOS 120 as to finding a harmful deviation (416).

Since the software algorithms of the initialization process in the POST routine may add, delete, or modify procedures with new POST codes, the definition of the golden image POST code sequence is upgradable through server management software running on the service station 102. Such management software sends a new golden image to the BMC 110 when the server 106 is provided with a new UEFI BIOS firmware release. The upgrade in the definition of the golden POST code sequence avoids an incorrect identification of a deviation from an older golden POST code file. Server management software can also invalidate specific older versions of the golden POST code file inside a database of server BMCs. In this example, the database has pairs of BIOS images and golden files and may be managed by the service station 102. When an administrator decides to upgrade the firmware version of the server 106, the administrator will upgrade corresponding golden file. This process may be made through sending a new firmware package including the firmware image, golden file, and script file, through an upgrade protocol such as Redfish firmware upgrade protocol.

Alternatively, the deviation may be a known deviation that is an accepted compromise. For example, a POST code deviation may be found for a known problem that an administrator has accepted such as a using a low cost dual in-line memory module having frequency decline that causes a POST code deviation compared to the golden file POST code. The administrator may choose to keep the module in place resulting in continual POST code deviations.

Once a harmful deviation is detected, the BMC 110 starts executing the "Deviation Analysis" section of the example module in both UEFI BIOS firmware 120 and the BMC 110. In this example, the BMC 110 requests that the UEFI BIOS firmware 120 enable a UEFI variable ("Deviation_Analysis"), which allows the suspected software process of the POST routine to send a message relating to the deviation to an accessible memory destination. Since such messages are built-in by the compiler and the linker of the UEFI BIOS firmware 120 and are only active when the specific UEFI deviation analysis variable is enabled, the message output does not change based on the status of the deviation in the sequential POST code in a future power-on. The UEFI BIOS firmware 120 will send an inquiry to the BMC 110 whether to perform the "Deviation Analysis" routines before handoff to the operating system 140. Once a certain condition from the deviation analysis is confirmed between the BIOS firmware 120 and the BMC 110, another UEFI variable is enabled. The BMC 110 then power cycles the server to perform the deviation analysis rather than handoff to the operating system 140.

FIG. 4B shows the deviation analysis function of the example module. The BMC 110 starts the deviation analysis based on the identification of a deviation (434). The BMC 110 requests that the UEFI BIOS 120 sets the UEFI variable "Deviation Analysis" (436). The BMC 110 then checks whether authorization has been granted from the UEFI BIOS 120 (438). If authorization is pending, the BMC 110 continues to check for the grant (438). If authorization is granted, the BMC 110 power cycles the server (440).

The UEFI BIOS 120 sets the UEFI variable "Deviation Analysis" to initiate the deviation analysis (442) in response to the request from the BMC 110. The UEFI BIOS 120 then grants the BMC 110 authorization to start the deviation analysis function (444). The UEFI BIOS 120 then waits for the BMC to power cycle the server (446). Once the server 106 begins the power cycle initiated by the BMC 110 (440), the POST routine begins, and the UEFI BIOS 120 logs the occurrence of the deviation analysis to the SEL 126 in the flash memory 122 (448). The UEFI BIOS 120 then exposes additional messages from the deviation analysis received from the BMC 110 (450). The UEFI BIOS 120 exposes additional messages after the power cycle, since the entire UEFI BIOS initialization sequence is rerun. Since the UEFI variable "Deviation Analysis" is enabled, the UEFI BIOS POST routine will collect more usable hardware component health status, software data structure, software retry counter and recovery mechanism data. The POST routine translates the data as the additional messages with human readable data and machine data, which are transferred to a physical destination such as flash memory 122 accessible by the BMC 110.

The UEFI BIOS 120 then clears the UEFI variable "Deviation Analysis" (452). The UEFI BIOS 120 then waits for the BMC 110 to start the deviation recovery in the case of automatic recovery or waits for the server 106 to be powered down in the case of manual intervention (454).

The BMC 110 monitors the server 106 and determines whether the POST routine has been started after the power cycle is initiated (456). If the POST routine has not been started, the BMC 110 continues to monitor whether the POST routine has been started (456). If the POST routine has been started, the BMC 110 collects data relevant to the deviation analysis from the server (458). The routines for collecting data for the deviation analysis are specific to identified potentially deviant hardware and software. The deviation analysis routines may be programmed by the developer of the UEFI BIOS firmware based on the specification and recommendations from the hardware or software providers of components of the server 106.

The deviation analysis is reviewed by the BMC 110 to determine whether the POST sequence may be recovered to repair the POST routine for any or all identified deviations (460). In this example, an administrator may select recovery for each deviation separately or simultaneous recovery for all deviations. If the POST sequence cannot be recovered from the deviation, the BMC 110 sends an alarm or alert to the management software on the service station 102 through the network 104 (462). The BMC 110 then powers down the server as manual intervention is required (464). As explained above, the service station 102 software may schedule a technical inspection and repair of the server 106 and or provide the administrator the ability to decide other remedial actions. If based on the deviation analysis, the deviation may be addressed and therefore the POST sequence may be recovered automatically, the BMC 110 starts the deviation recovery process (466).

A service subroutine (termed "DeliverStatus" in this example) performs a built-in analysis and may be included in any imperative initialization service routine of the UEFI BIOS firmware 120 in the parent layer. In this example, the deliver status subroutine is added to a hardware device detection service routine of the secure boot service routine of the UEFI BIOS firmware 120. The deliver status service routine is only functional when the UEFI "Deviation_Analysis" variable is set as true (442) in FIG. 4B. Thus, when the expose more message step (450) is executed by the UEFI BIOS firmware 120, the deliver status service routine is executed. The deliver status service routine has two purposes. First, the deliver status service routine collects hardware device health status of the server by running a diagnostic routine. Second, the deliver status routine determines a usable software message exposition, then stores the messages to an accessible memory destination such as a host memory region or a partition of a storage device accessible by the BMC 110 (e.g., flash memory 122).

The deviation analysis information is stored in the software messages output by the deliver status routine. Each message includes a generic header with human readable schema and a complex payload with technical schema relating to the deviation. In this example module, the generic header uses common schema which has human readable data and can be easily adopted by the deviation recovery function of the example module. The technical schema is created by using custom metadata which has various lengths and contents, to describe the exact situation of the specific service routine in running order. The technical schema thus provides a service engineer data for performing a deep dive analysis for the root cause of the deviation.

Figure 5:
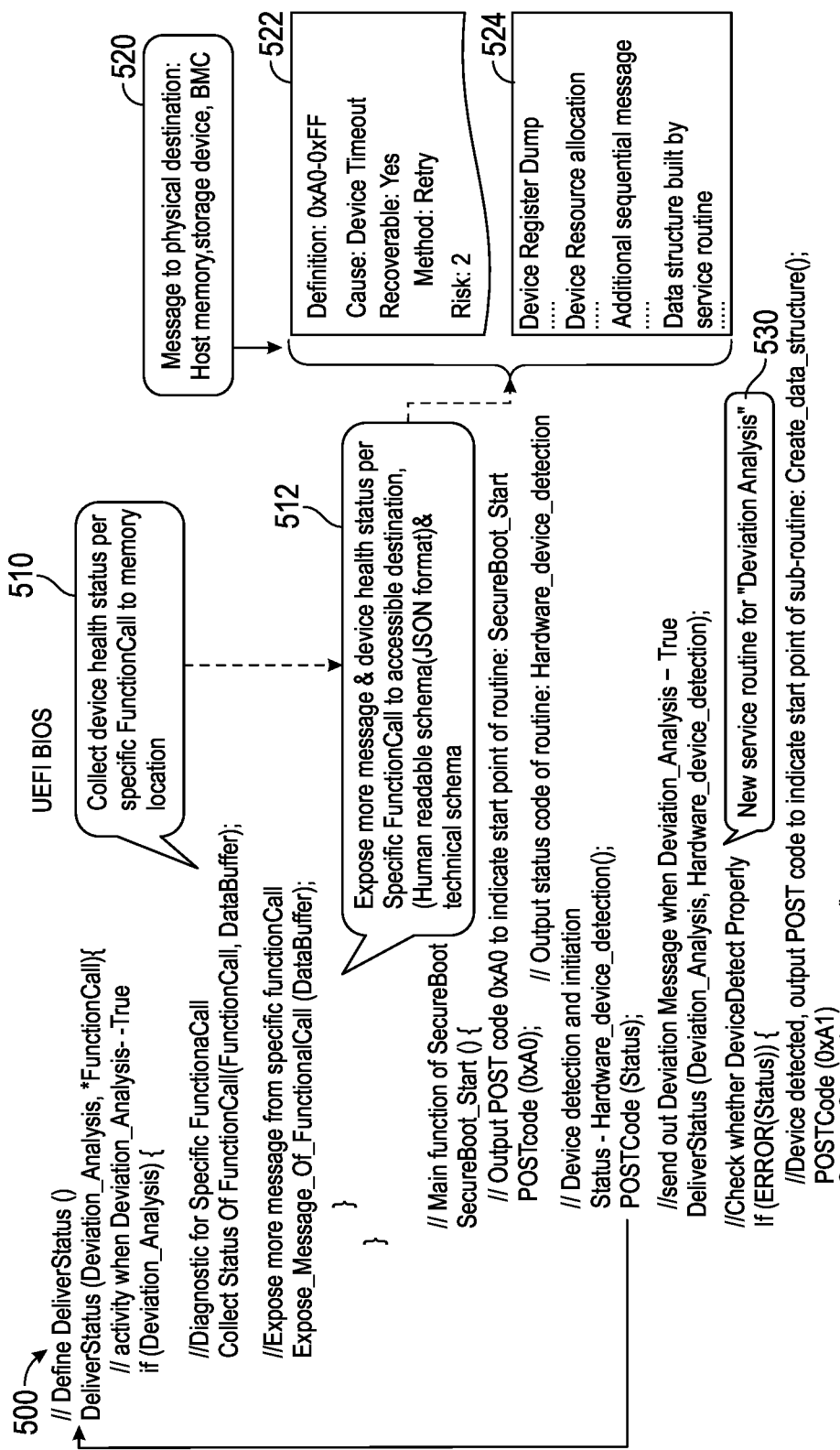
FIG. 5 is a code sequence of the secure boot service in the POST routine that includes a deliver status service routine of the diagnosis function of the example module, according to certain aspects of the present disclosure.

FIG. 5 is a code segment 500 of an example of the "DeliverStatus( )" service routine run in the software service routine "SecureBoot_Start( )" of the POST routine executed by the UEFI BIOS firmware 120 in the deviation analysis in the expose messages step (450) in FIG. 4B. In this example, the secure boot is triggered by receiving POST code 0xA0. The secure boot code segment 500 accesses two mandatory service routines of the deliver status service routine, a collect status routine 510 and an expose message routine 512. The service routines 510 and 512 are built inside an example "DeliverStatus" routine 530 for sequential POST code deviation analysis. In this example, when the UEFI variable "Deviation Analysis" is true, the routine collects device health status based on specific function calls according to the subroutine termed "Collect_Status_Of_Function_Call" (510). The function calls are written based on specific service routines that have POST code deviation identification supported by the POST code sequence from the golden file 124. For example, a function call for a specific hardware component may support the reading of a health status register of the hardware component associated with a POST code. The collected health status is stored in a specific memory location. In this example, the specific function call subroutine results in storage of the collected health status data in a readable format, such as JSON format, through execution of the service routine, "Expose_Message_of_Function_Call" (512).

The start point of a secure boot start is indicated by the POST routine outputting the POST code 0xA0. The deliver status routine 530 is only active when the hardware detection routine determines any deviation by the POST codes output by the POST routine from the corresponding POST codes in the golden file POST code sequence. The deliver status routine 530 loads the UEFI variable Deviation_Analysis and the address of the hardware device detection. This loops the routine back to perform function calls specific to the deviation POST codes and deliver the status data. With the UEFI variable Deviation_Analysis set as true, the deliver status routine 530 re-executes the function calls and then creates the data structure for the deviation messages.

For example, a message 520 may be generated and stored to a physical destination such as host memory, a storage device, or BMC flash. The message 520 includes a human readable schema 522 and a technical schema 524. In this example, the human readable schema 522 is in the JSON format and includes the definition of the deviation, the cause of the deviation, whether a recovery is possible, the proposed method for repair, and the risk factor reflecting the severity of the deviation. The information in the human readable schema is output by the specific function call depending on the specific hardware or software component. The technical schema 524 in this example, includes a register dump from the device from a specific range of memory allocation, resource allocation data, additional sequential messages, function settings, configuration settings, and a data structure built by the service routine.

As explained above, the service routines 510 and 512 collect hardware device health status and expose messages of software function calls. The service routines do not interfere with the original behavior of the POST running order or modify any UEFI variable. The collection of hardware device health status ("Collect_Status_Of_FunctionCall") 510 is used to collect associated technical information on hardware device health status, hardware device's system resource utilization and software data structure. The other service routine ("Expose_Message_Of_Function-Call") 512 is used to expose or store messages that include data collected by the collect status service routine 510 to an accessible destination. For example, the hardware device detection service routine in FIG. 5 is an imperative service routine and thus the deliver status routine is added to ensure deviation analysis is performed during the POST routine.

The deliver status subroutine may be added to any imperative UEFI BIOS firmware service routine, such as the hardware device detection service of the secure boot service routine in FIG. 5, that runs on all different execution paths. Alternatively, the deliver status subroutine may be added to a platform memory initialization service routine that invokes a DIMM device detection subroutine. The status of DIMM detection may trigger an alternate POST path. The absence of a DIMM device from the detection subroutine would result in the report of less platform memory size. The initialization routines that require large memory would be changed as a result resulting in the alternate POST path. The deliver status routine could deliver the device health status as a result of the deviation from the POST code.

Figure 6:
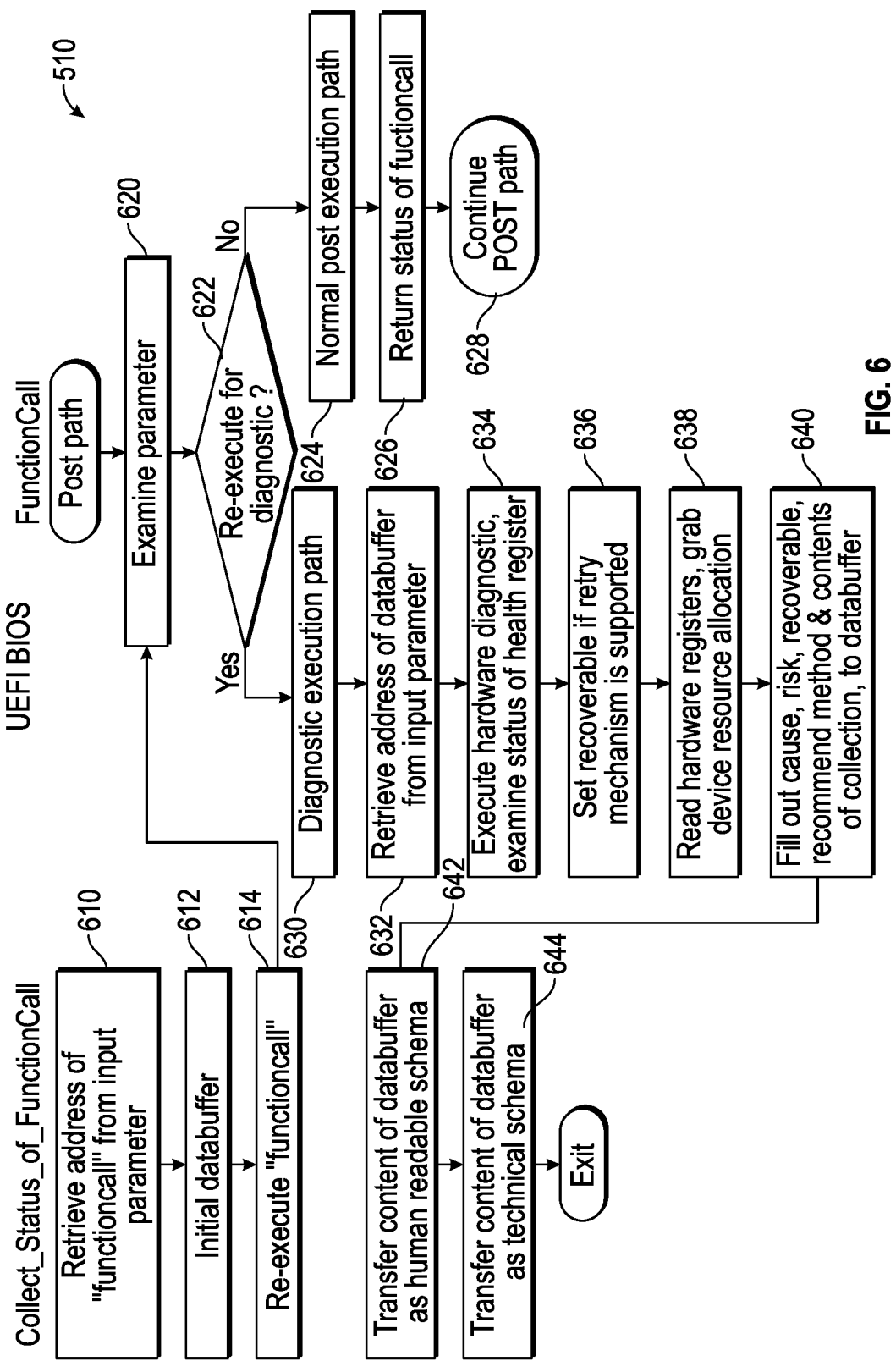
FIG. 6 is a flow diagram of the collect status of function service routine of the function call routine in FIG. 5, according to certain aspects of the present disclosure.

FIG. 6 is a flow diagram of the collect status of function call service routine 510 in relation to the deliver status routine that is part of the secure boot service routine in FIG. 5. The SecureBoot_Start routine performs the hardware device detection service routine once during the normal POST execution path. In the deviation analysis cycle, the collect status of function call service routine 510 re-executes the hardware device detection service routine in a POST diagnostic execution path. The address is passed so the device detection service routine can access the function call routine. Thus, the collect status of function call routine 510 first retrieves the address of the function call routine from an input parameter from its parent layer, the Deliver Status routine (610). The routine then initializes a data buffer (612). The routine then re-executes the function call (614).

The collect status routine exits to the function call routine, which examines the parameter of whether a deviation has occurred (620). Based on the parameter, the routine determines whether the function call needs to be re-executed for the diagnostic analysis and thus collect additional diagnostic data (622). If there is no need for re-execution, the routine follows a normal POST execution path (624). The function call routine then returns the status of the function call to normal (626) and continues on the POST path (628).

If the function call routine needs re-execution, the routine begins the diagnostic execution path (630). The routine retrieves the address of the data buffer from the input parameter (632). The routine then executes the hardware diagnostic and examines the status of the health register according to the specific hardware or software that produces the deviation (634). The routine sets a recoverable flag, if the deviation is recoverable based on the analysis (636). The routine then reads the hardware registers and grabs the resource allocation data associated with the hardware (638). The routine then writes the cause of the deviation, the risk factor, whether the deviation is recoverable, the recommended method of recovery and the other contents of collection from the registers and other data sources to the data buffer (640). The routine then transfers the cause of the deviation, the risk factor, whether the deviation is recoverable, and the recommended method of recovery data in human readable format as human readable schema (642). The routine then transfers other selected data as technical schema (644).

Figure 7:
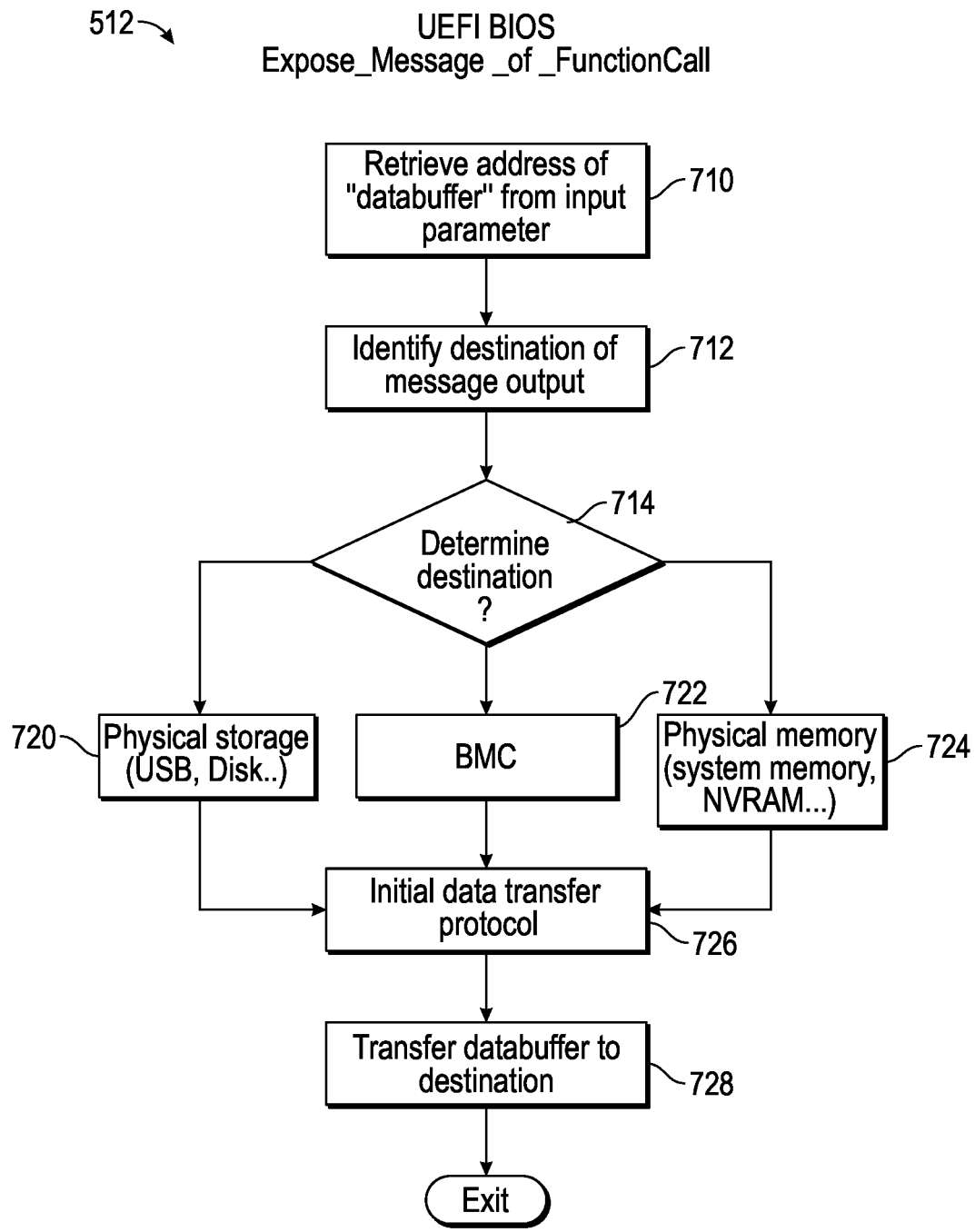
FIG. 7 is a flow diagram of an expose message of function call service routine of the function call routine in FIG. 5, according to certain aspects of the present disclosure.

FIG. 7 is a flow diagram of the expose message of function call service routine 512. The Expose Message routine 512 first retrieves the address of the data buffer from the input parameter set by the collect status routine 510 (710). The routine then identifies the destination of the message output (712). The message is stored for re-execution of the diagnostic routine for the hardware by determining the destination (714). The routine then sets the destination as either physical storage (720), in the flash memory 122 (722) or in physical memory such as system memory (724). The routine then initializes a data transfer protocol such as Redfish or IPMI (726). The routine then transfers the data buffer to the designated destination via the data transfer protocol (728).

In the diagnostic routine in FIG. 4B, the BMC 110 searches the content of the human readable schema 522 in the message 520 shown in FIG. 5 received from the UEFI BIOS firmware 120 running the expose message service routine 512. The BMC 110 may identify whether the harmful analysis is recoverable from the data in the human readable schema (460). Based on this data, the BMC 110 then decides whether the BMC 110 should start the "Deviation Recovery" function of the example module or freeze the server by sending an alarm message to the server management software.

The Deviation Recovery mechanism is an integrity method for the UEFI BIOS firmware specific function call service routine 510 in FIG. 5 and the supported hardware device. In this example, the developer of the UEFI BIOS firmware 120 pairs a suitable recovery method to designate the function call. The designated function call has the "DeliverStatus" service routine 500 installed already. Once the recovery method is finished executing, the administrator/IT engineer observes whether the recovery mechanism reverses the deviation and returns the POST routine to a normal operation thus outputting the correct POST code in the POST code sequence. In this example, the recovery methods are a customized design for each type of hardware component that are developed by the firmware developer. Similar function calls may have paired recovery methods for different software that is initialized by the POST routine.

FIG. 8 is a table 800 of some example recovery methods for different hardware and software components that may be returned by different function calls. FIG. 8 includes a column 810 that lists different faults for discoverable hardware or software of the server 106. Another column 820 lists the recovery mechanism that may be executed by server management software run by the server 106.

Performing the deviation recovery first references a policy setting of automatic recovery or manual recovery determined by the deviation analysis process in FIG. 4B. The automatic policy setting allows the UEFI BIOS firmware 120 and the BMC 110 on the server 106 to automatically reverse the effects of the identified deviation on the POST routine. This may involve set actions that are shown in the table in FIG. 8 that may be set by the firmware developer. The manual policy setting allows manual intervention by a predetermined schedule such as alerting a technician to replace or update hardware components or restart software. The policy setting is configurable through server management software on a remote management station such as the service station 102 in FIG. 1. The policy setting is sent to the BMC 110 for the example module in the POST routine.

The automatic deviation recovery function involves the BMC 110 starting the deviation recovery process by using the recovery mechanism built into either the UEFI BIOS firmware 120 or a recovery mechanism performed by BMC 110. The automatic recovery mechanisms may allow the server 106 to correct the POST sequence but may not be effective in total elimination of the deviation. Thus, allowing manual inspection of the technical schema in the message and thus scheduling manual intervention on a full server diagnostic may be required by a technician.

As shown in FIG. 4C, the deviation recovery is initiated by the BMC 110 (466). The BMC 110 first determines whether the recovery is manual or automatic from the message output by the deliver status routine 500 (470). If the recovery is manual, the BMC 110 allows scheduling of the recovery process at a selected time based on a server maintenance schedule arranged by the administrator (472). If the recovery is automatic, the BMC 110 determines whether the recovery process is performed by the BMC 110 (474). If the recovery is to be performed by the BMC 110, the BMC 110 performs the recovery process according to the specific hardware of software (476). For example, the BMC 110 may reset and enable or disable a physical hardware interface. The BMC 110 may power on and off to force the hardware logic back to a stable state. The BMC 110 may reset a NVMe device by using a NVMe management interface.

If the recovery is not to be performed by the BMC or once the BMC completes the recovery process, the routine determines whether the recovery is performed by the UEFI BIOS firmware 120 (478). If the recovery is not performed by the UEFI BIOS firmware, the routine power cycles the server (480). If the recovery is to be performed by the UEFI BIOS firmware 120, the BMC 110 requests that the UEFI BIOS sets the UEFI variable "Deviation Recovery" (482). The BMC 110 monitors whether a grant is received from the UEFI BIOS 120 (484). If a grant is not received, the BMC 110 continues to request the UEFI BIOS 120 sets the UEFI deviation recovery variable (482). If the BMC 110 receives the grant from the UEFI BIOS 120, the BMC 110 power cycles the server (480).

When the UEFI BIOS 120 receives the request (482) from the BMC 110, the UEFI BIOS 120 sets the UEFI variable, "Deviation_Recovery" (486). The UEFI BIOS 120 then grants the BMC 110 permission to start the deviation recovery (488). The UEFI BIOS 120 then stops and waits for the BMC to power cycle the server (490).

Once the power cycle begins, the UEFI BIOS firmware 120 logs the deviation recovery to the SEL 126 stored in the flash memory 122 (492). The UEFI BIOS firmware 120 then performs the recovery mechanism (494). For example, the BIOS firmware may force an I2C host controller to pull a data/clock signal to low to force a slave device to reset itself to an original idle state. Another example, is the BIOS firmware power on and off a hot plug supported device. After completion of the recovery mechanism, the UEFI BIOS 120 clears the UEFI variable, "Deviation_Recovery" (496). The UEFI BIOS firmware 120 then reboots the server (498).

Flow diagrams in FIGS. 6-7 are representative of example machine readable instructions for the different service routines performed by the deliver status routine in FIG. 5. In this example, the machine readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowcharts may be implemented manually. Further, although the example algorithm is described with reference to the flowcharts illustrated in FIGS. 6-7, persons of ordinary skill in the art will readily appreciate that many other methods of implementing the example machine readable instructions may alternatively be used. For example, the order of execution of the blocks may be changed, and/or some of the blocks described may be changed, eliminated, or combined.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A computer system for detecting deviations in a power-on self-test routine, the computer system comprising:
    a basic input output system (BIOS) including a power-on self-test (POST) routine having multiple phases executed between power-on and hand off to an operating system;
    a controller in communication with the BIOS and in network communication with an external server having a golden image POST sequence; and
    a memory coupled to the controller and the BIOS, the memory storing a golden image POST code sequence received by the controller from the external server, wherein the controller and BIOS are operable to:
    receive a sequence of POST codes from the POST routine, the sequence of POST codes generated on execution of the multiple phases;
    comparing the sequence of POST codes to the golden image POST code sequence; and
    identifying a deviation in the POST routine based on at least one POST code of the sequence of the POST codes not matching the golden image POST code sequence.

2. The system of claim 1, wherein the controller is a baseboard management controller.

3. The system of claim 1, wherein the computer system is a server.

4. The system of claim 1, further comprising a network interface, wherein the sequence of POST codes is transmitted to a remote management server.

5. The system of claim 1, wherein the deviation is one of a disablement of a security feature phase, impairment of a security feature phase, or detection of an untrusted condition of the POST routine.

6. The system of claim 1, wherein the deviation is one of a hardware device of a plurality of hardware devices not found from a discovery procedure in the POST routine, an inactive hardware interface, or a decline of hardware speed of a hardware device after initialization by the POST routine.

7. The system of claim 1, wherein the deviation is one of an invalid, unavailable, or unsupported software service.

8. The system of claim 1, wherein the memory is flash memory storing the POST code sequence.

9. The system of claim 1, wherein the golden image POST code sequence is upgradable through server management software transmitting an updated golden image POST image to the controller via a network interface.

10. The system of claim 1, wherein the controller and BIOS are further operable to:
    perform a deviation analysis based on the identified deviation;
    store a message including the results of the deviation analysis; and
    power cycle the computer system after performance of the deviation analysis.

11. The system of claim 10, wherein the deviation analysis includes a recovery method for repairing the deviation, and wherein the BIOS and the controller are further operable to automatically perform the recovery method after the power cycle.

12. A method of identifying a deviation in a power-on self-test routine executed on start-up of a computer system, the computer system including a basic input output system (BIOS), a controller, and a memory, the BIOS including a power-on self-test (POST) routine having multiple phases executed between power-on and hand off to an operating system; the controller in communication with the BIOS and in network communication with an external server having a golden image POST sequence; and the memory coupled to the controller and the BIOS, the method comprising:

receiving the golden image POST code sequence from the external server over the network via the controller;

storing the golden image POST code sequence in the memory;

executing the POST routine of the BIOS;

receiving a sequence of POST codes from the POST routine generated on execution of the multiple phases of the POST routine;

comparing the sequence of POST codes to the golden image POST code sequence via the controller; and identifying a deviation in the POST routine based on at least one POST code of the sequence of the POST codes not matching the golden image POST code sequence.

13. The method of claim 12, wherein the controller is a baseboard management controller and the computer system is a server.

14. The method of claim 12, further comprising transmitting the sequence of POST codes to a remote management server via a network interface.

15. The method of claim 12, wherein the deviation is one of disablement of a security feature phase, impairment of a security feature phase, or detection of an untrusted condition of the POST routine.

16. The method of claim 12, wherein the deviation is one of a hardware device not found from a discovery procedure in the POST routine, an inactive hardware interface, or a decline of hardware speed of a hardware device after initialization by the POST routine.

17. The method of claim 12, wherein the deviation is one of an invalid, unavailable, or unsupported software service.

18. The method of claim 12, further comprising:

performing a deviation analysis based on the identified deviation;

storing a message including the results of the deviation analysis; and power cycling the computer system after performance of the deviation analysis.

19. The method of claim 18, further comprising repairing the deviation via data in the message.

20. A non-transitory computer readable medium having stored thereon software instructions that, when executed by a processor in a computer system, cause the processor to:

receive a golden image POST code sequence from the external server over a network;

execute multiple phases of a power-on self-test (POST) routine for the computer system;

output a sequence of POST codes during the execution of the POST routine;

compare the sequence of POST codes to the golden image sequence of POST codes; and identify a deviation in the POST routine based on at least one POST code of the sequence of POST codes not matching the golden image POST code sequence.

\* \* \* \* \*